United States Patent [19]

Mason

[11] 3,948,473

[45] Apr. 6, 1976

[54] UNIVERSAL CABLE RACK

[75] Inventor: John R. Mason, Los Angeles, Calif.

[73] Assignee: Dracon Industries, Chatsworth, Calif.

[22] Filed: Apr. 29, 1974

[21] Appl. No.: 464,849

[52] U.S. Cl.................. 248/49; 52/660; 174/68 C; 211/182; 248/68 R; 403/292
[51] Int. Cl.² ......................................... F16L 3/22
[58] Field of Search............ 248/49, 68 R, 241, 298, 248/307; 174/68 C, 72 A; 182/150, 178, 207; 52/660; 108/55, 56; 403/264, 345, 292; 82/39; 211/182

[56] References Cited
UNITED STATES PATENTS

| | | | |
|---|---|---|---|
| 3,329,103 | 7/1967 | Cohen.................................. | 108/54 |
| 3,848,747 | 11/1974 | Thompson........................ | 108/53 X |
| 3,851,378 | 12/1974 | Dessert............................. | 248/49 X |

Primary Examiner—Roy D. Frazier
Assistant Examiner—Rodney H. Bonck
Attorney, Agent, or Firm—Flehr, Hohbach, Test, Albritton & Herbert

[57] ABSTRACT

A cable rack for supporting multi-cable runs constructed to obtain desired length and width using unitary rack assemblies. The unitary rack assemblies have left and right tubular side stringers and a plurality of tubular cross straps all having accessible open ends. Unitary rack assemblies may be attached end to end by insertion of connecting bars into the ends of the abutting side stringers. Unitary rack assemblies may be assembled side by side for providing a wide cable rack by utilizing cross-over members having attachment means at each end for securing to parallel unitary rack assemblies. Cross-over members provide for either staggered or aligned cross-straps in the unitary rack assembly. A wide cable rack may be provided by inverting a unitary rack assembly, placing it between two spaced parallel unitary rack assemblies, and attaching the side stringers of adjacent unitary rack assemblies. Once the universal cable rack width is assembled, horn members are inserted and retained in the outside accessible cross-strap open ends for retaining the cable runs within the universal cable rack width.

7 Claims, 11 Drawing Figures

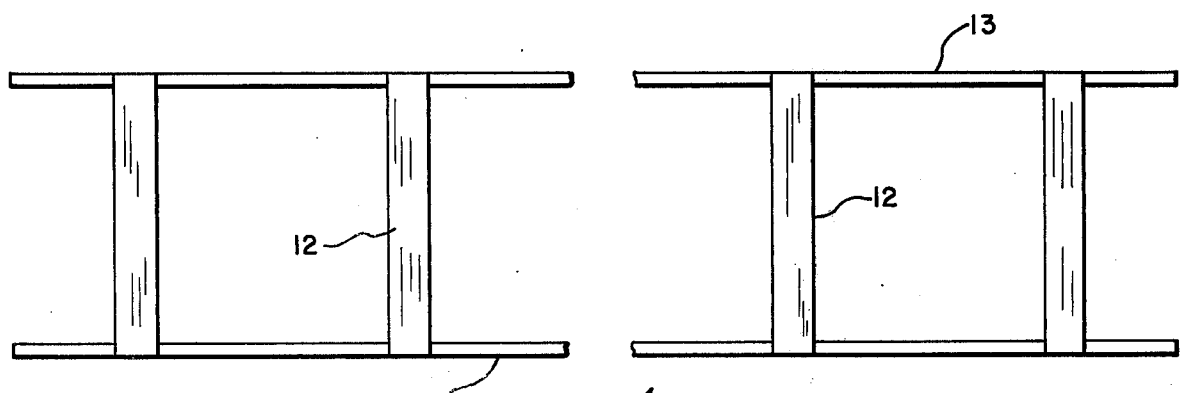
FIG.—1
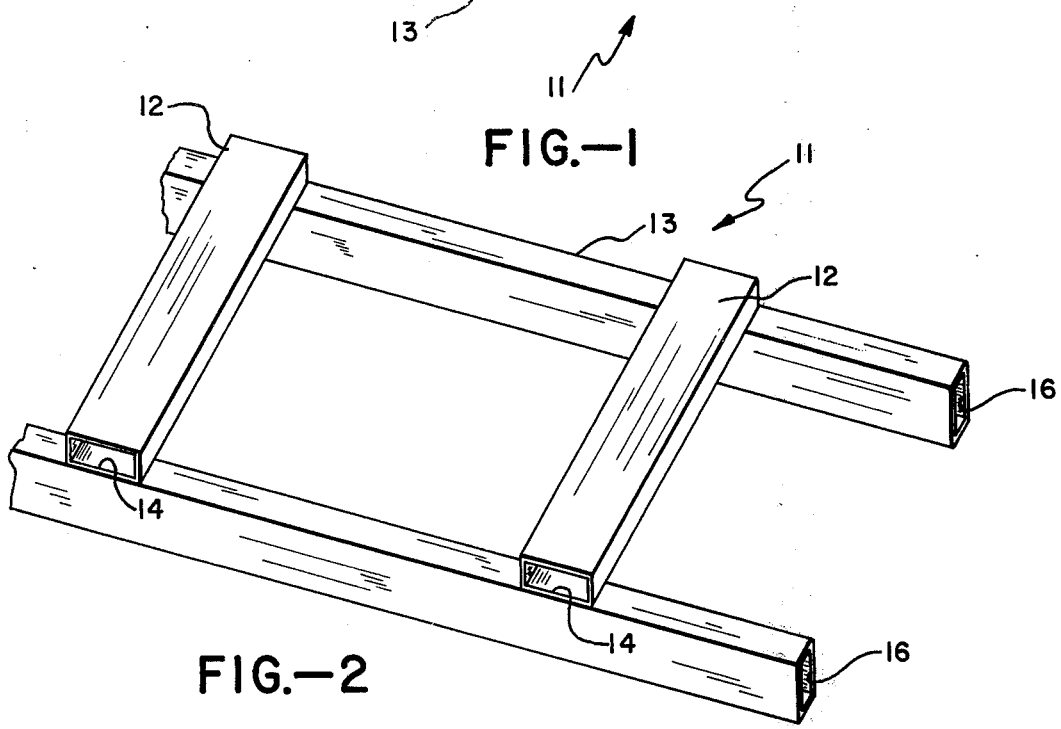
FIG.—2
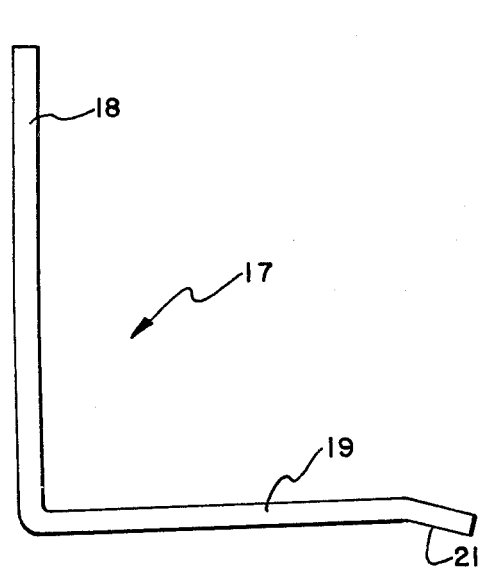
FIG.—3
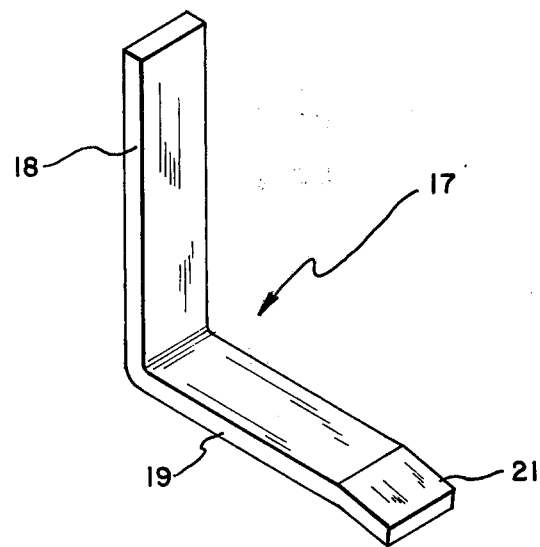
FIG.—4

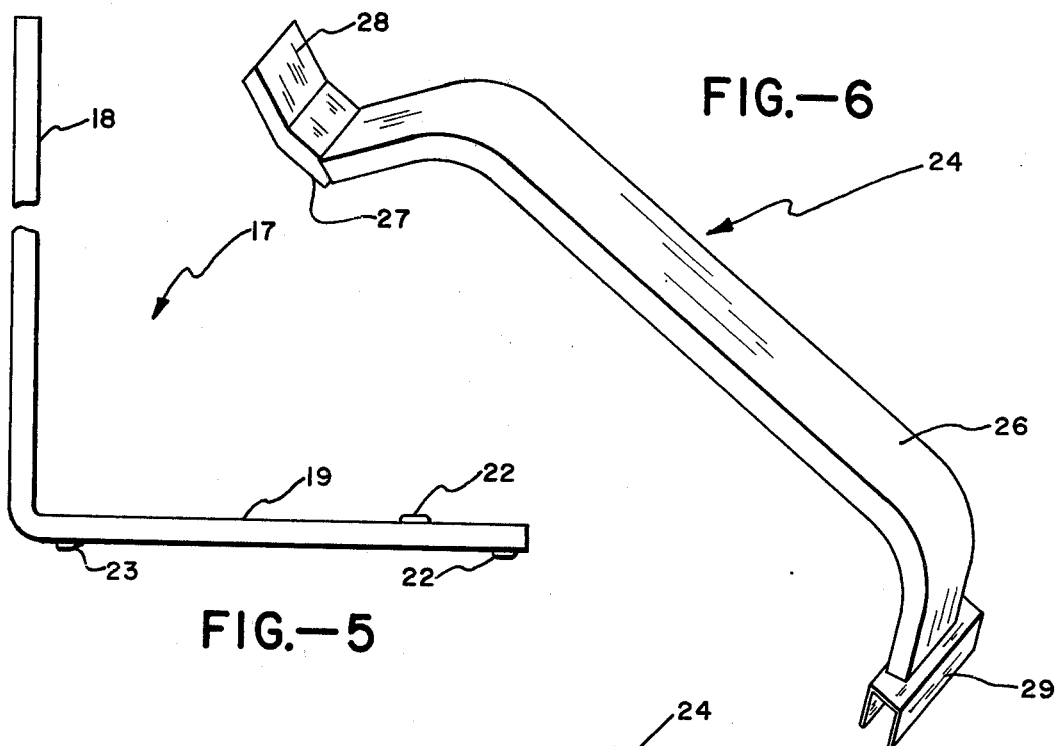
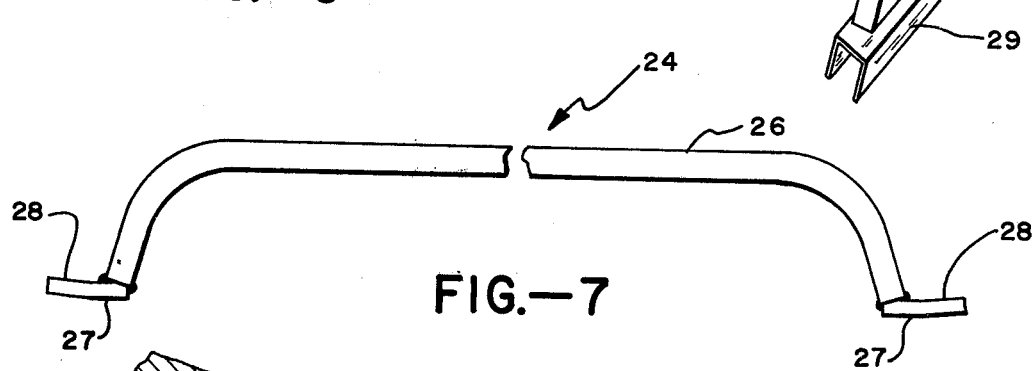
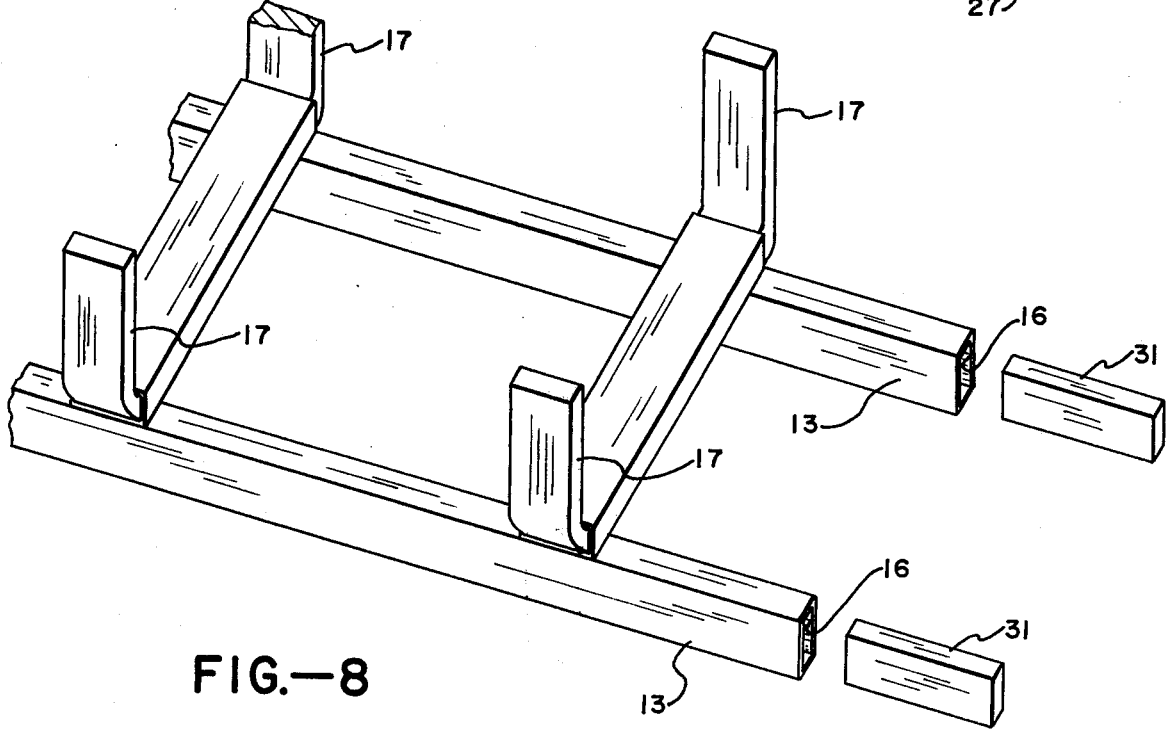

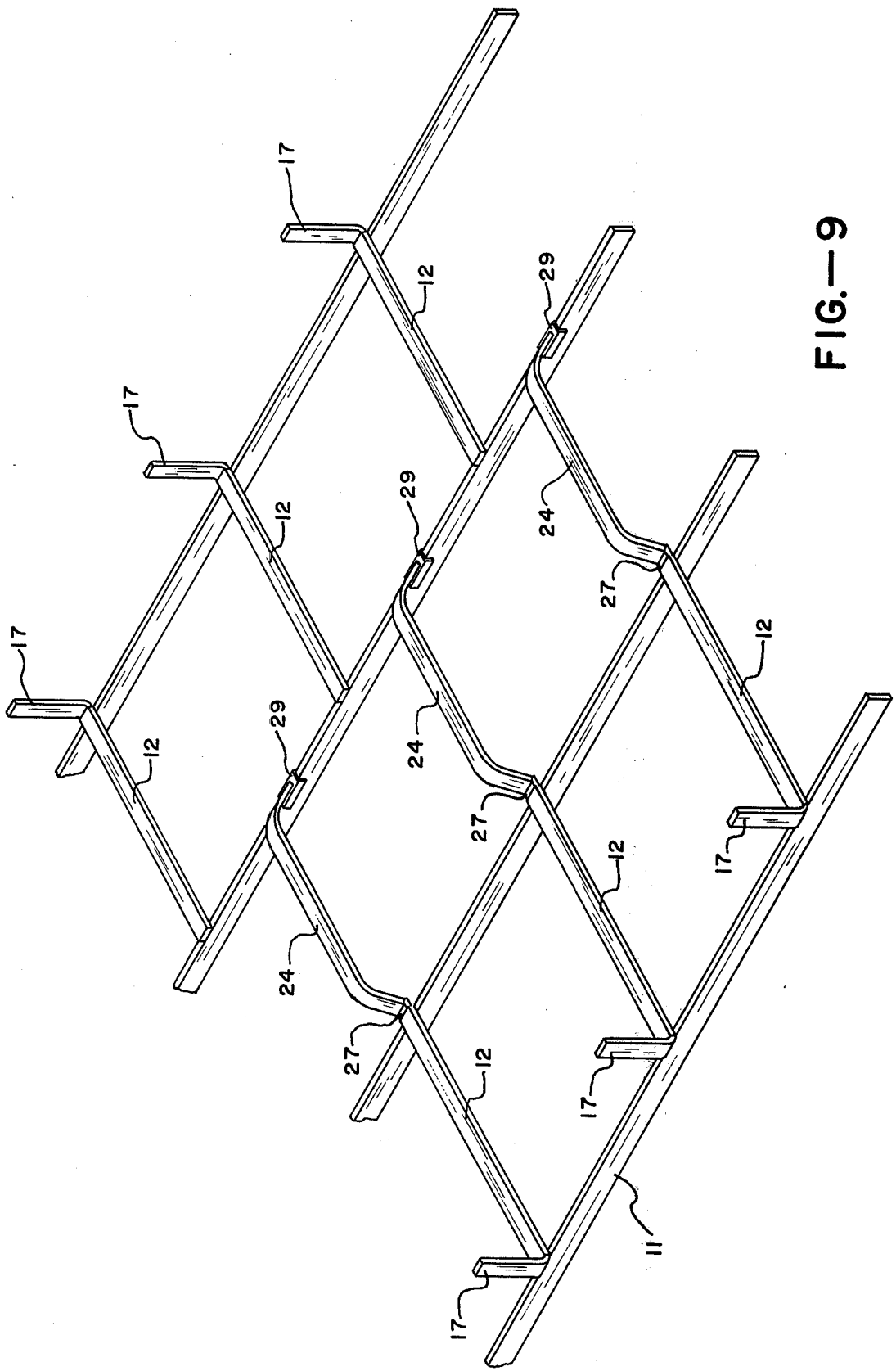
FIG.—9

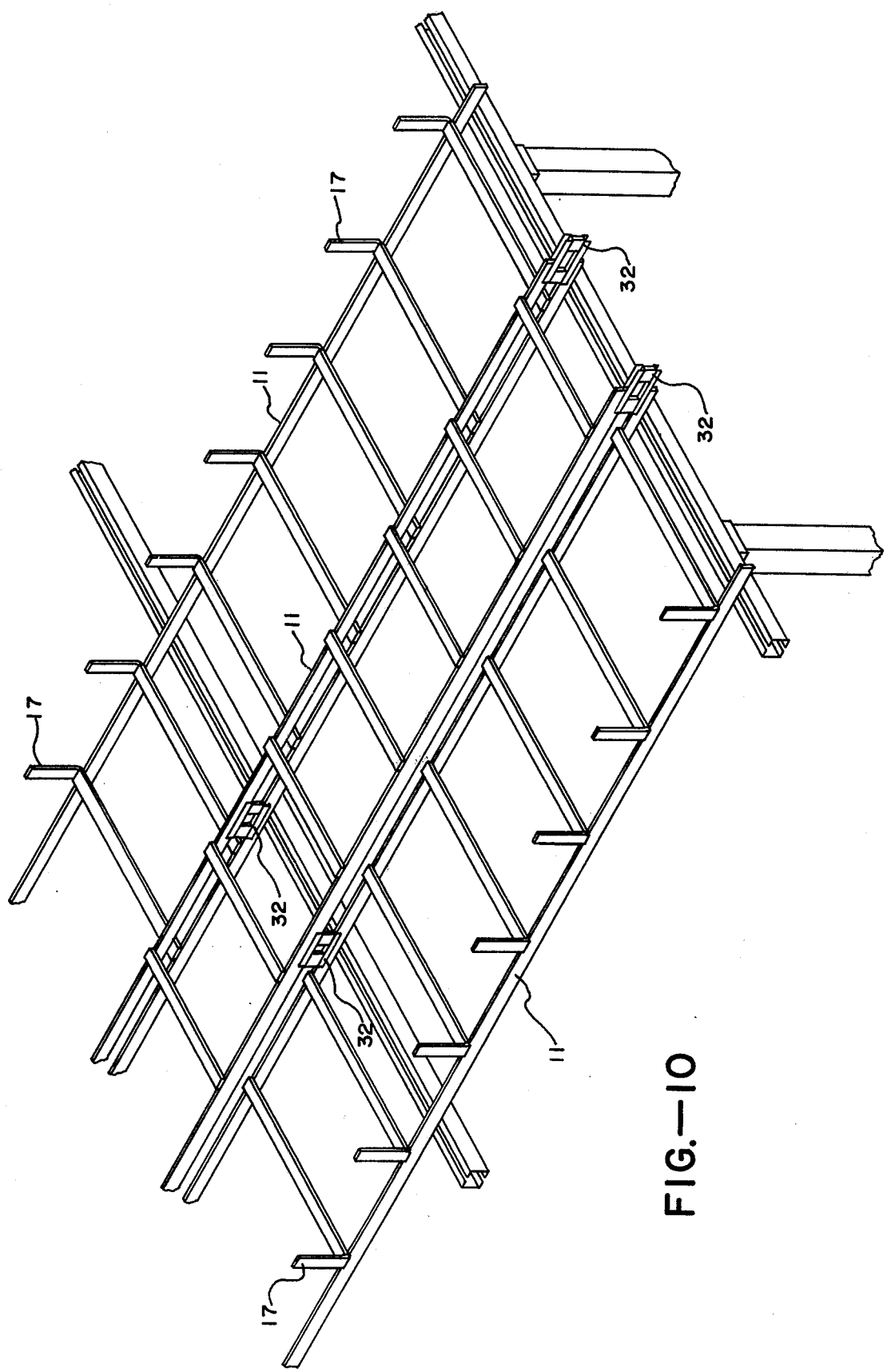
FIG.—10

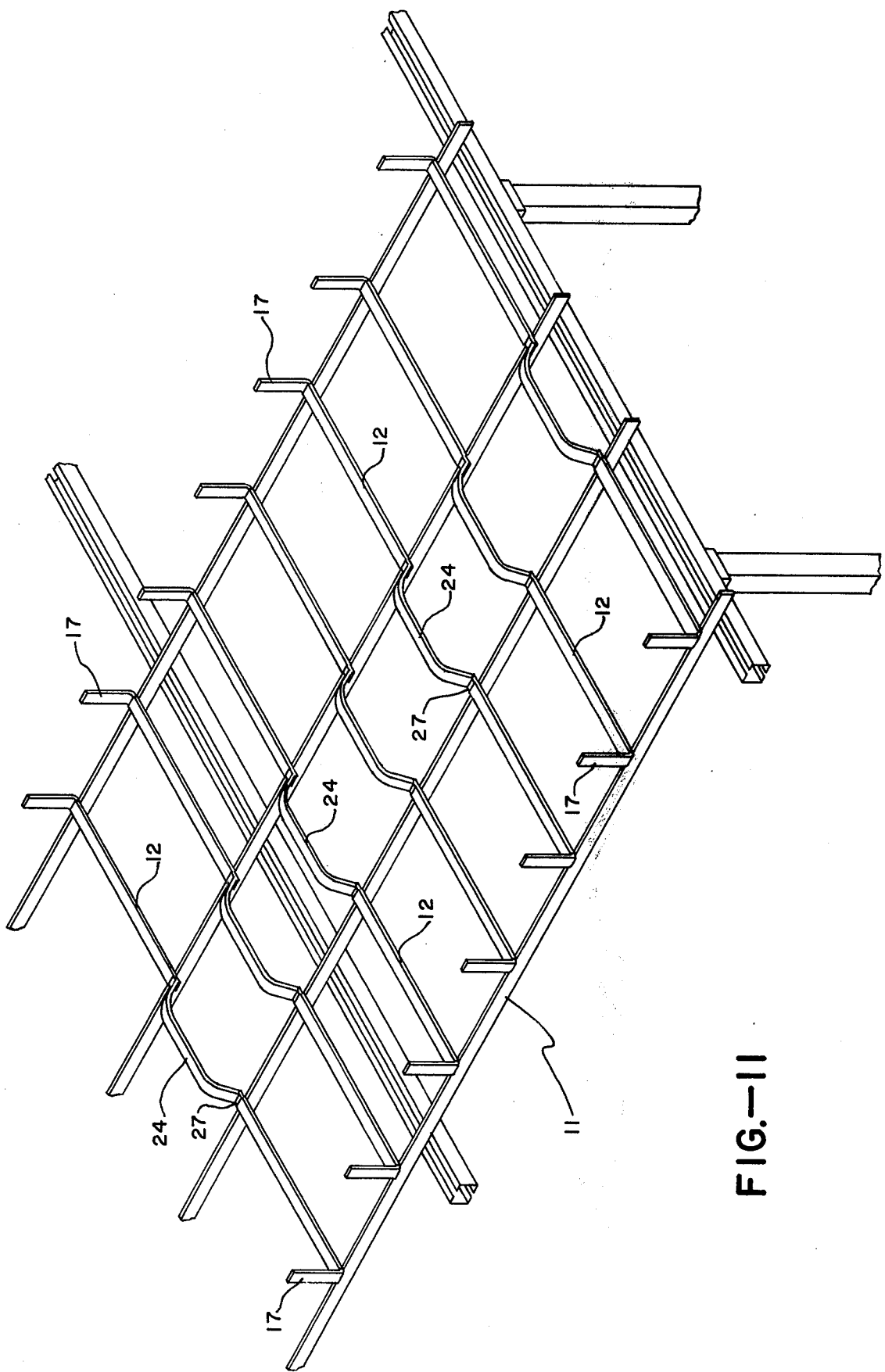

UNIVERSAL CABLE RACK

BACKGROUND OF THE INVENTION

1. Field of the Invention.

The present invention discloses a universal cable rack for utilizing the maximum available space for cable runs, and more particularly to a universal cable rack which may be assembled to obtain the most desirable length and width, with provision for retaining the cable runs within the width of the rack.

2. Description of the Prior Art.

Cable trough designs currently available generally have cross-strap members between side stringers which do not provide means for receiving supporting members therebetween for attaching parallel racks. Cable rack depth is often determined by the height of the unitary rack side stringers. Moreover, overhead cable racks of prior design must avoid overhead light fixtures, reducing overhead space available for cable runs.

There is therefore a need for a universal cable rack which is readily adjustable in length and width and which may provide a depth of rack considerably greater than the height of the side stringers and which utilizes the overhead space between parallel running cable racks whether or not overhead lighting fixtures are present.

SUMMARY AND OBJECTS OF THE INVENTION

A universal cable rack is disclosed for supporting cable runs which includes unitary rack assemblies having left and right tubular side stringers and a plurality of tubular cross-straps having accessible open ends. Horn members are provided for insertion and retention in the open ends of the cross-straps for providing desired cable rack depth. Cross-over members are provided, having means on each end thereof for attachment to spaced parallel unitary rack assemblies for providing wide cable racks. Connecting bars are provided for insertion into and connection between abutting side stringers for adding unitary rack assemblies end to end to obtain a desired cable rack length.

In general, it is an object of the present invention to provide a universal cable rack which uses the maximum available space for overhead cable runs and eliminates cable pile-up.

It is another object of the present invention to provide a universal cable rack which provides a predetermined cable rack depth for cable runs and eliminates a serving cable.

It is another object of the present invention to provide a universal cable rack having a minimum number of rudimentary parts for providing any desired cable rack depth, width and length.

Additional objects and features of the invention will appear from the following description in which the preferred embodiment has been set forth in detail in conjunction with the accompanying drawings.

BRIEF DESCRIPTION OF THE DRAWINGS

FIG. 1 is a plan view of a unitary rack assembly.

FIG. 2 is an isometric projection of the unitary rack assembly.

FIG. 3 is a side elevational view of a horn member.

FIG. 4 is an isometric projection of the horn member of FIG. 3.

FIG. 5 is a side elevational view of an alternate member embodiment.

FIG. 6 is an isometric projection of a cross-over member.

FIG. 7 is a side elevational view of an alternate cross-over member embodiment.

FIG. 8 is an isometric view of one embodiment of the universal cable rack using a single unitary rack assembly.

FIG. 9 is an isometric view of another embodiment of the universal cable rack, using multiple unitary rack assemblies and cross-over members.

FIG. 10 is an additional embodiment of the universal cable rack using multiple unitary rack assemblies.

FIG. 11 is yet another embodiment of the universal cable rack using multiple unitary rack assemblies and another embodiment of the cross-over member.

DESCRIPTION OF THE PREFERRED EMBODIMENT

The universal cable rack disclosed herein includes a unitary rack assembly shown generally at 11 in FIG. 1. As seen therein, unitary rack assembly 11 includes cross-straps 12 and left and right side stringers 13 running generally parallel to one another and generally perpendicular to cross-straps 12.

As may be seen in FIG. 2, cross-straps 12 are attached, for example by welding, to the tops of side stringers 13. Both cross-straps 12 and side stringers 13 are tubular, having open ends 14 and 16, respectively, which are accessible. Cross-straps and side stringers may be metal tubular members but other materials are envisioned as appropriate.

A horn member shown generally at 17 in FIG. 3 has an upright leg 18 and a generally horizontal leg 19. Horizontal leg 19 has an end portion 21 bent out of alignment with the remainder of horizontal leg 19. The angle of departure of the end portion 21 from the remainder of horizontal leg 19 is sufficient to create a snug fit when horizontal leg 19 is inserted into the interior of cross-strap 12 through the open end 14. Horn member 17 may be formed of some readily formable steel bar stock. One-quarter inch thick by three-quarter inch wide stock has been used for the horn member which requires an opening 14 to accept such stock. This provides a horn member having the general appearance shown in FIG. 4.

An alternate embodiment of the horn member 17 may be seen in FIG. 5. As in FIG. 3, the embodiment of FIG. 5 has an upright leg 18 and a generally horizontal leg 19. Protrusions 22 extend from the upper and lower surfaces of horizontal leg 19 near the end thereof. An additional protrusion 23 is formed on the underside of horizontal leg 19 near the juncture with upright leg 18. The protrusions 22 and 23 serve the same purpose as the end portion 21 in FIG. 3, which is to provide a snug fit between the horizontal leg 19 and the interior of cross-straps accessible through the open ends 14 thereof.

A cross-over member is shown generally at 24 in FIG. 6. Cross-over member 24 has an inverted U-shaped portion 26 which may be formed of a metal tubular section. At one end of U-shaped portion 26 is attached a tab 27 having an upwardly bent end portion 28. Tab 27 may be attached to the end of U-shaped portion 26 by welding for example. The opposite end of U-shaped portion 26 in the embodiment of FIG. 6 has an inverted bracket 29 formed to surround the top of side stringers 13. Bracket 29 may also be attached to the end of U-shaped portion 26 by means of welding.

An alternate embodiment of cross-over member 24 is seen in FIG. 7. An inverted U-shaped portion 26, which may be a tubular metal section, has attached at each end a tab 27 having an upwardly bent end portion 28 formed thereon.

The manner in which the foregoing described structural members are combined to form a universal cable rack having a desired length, width and height is shown by initial reference to FIG. 8. A universal cable rack is shown therein which includes a single unitary rack assembly 11 and a plurality of horn members 17. The horn members 17 may have an upright leg 18 of any desired length to provide for the necessary cable rack depth. It should be noted that only one unitary rack assembly having a predetermined length is shown in FIG. 8. Additional unitary rack assemblies 11 may be added end to end by utilizing a connection bar 31 formed to fit and be retained within the interior of side stringers 13 through open ends 16 thereof. In this fashion, the universal cable rack of FIG. 8 may attain any desired length and depth.

Turning now to FIG. 9 a wide cable rack is shown having unitary rack assemblies 11 and cross-over members 24 of the type shown in FIG. 6. Horn members 17 are inserted into the interior of cross-straps 12 through the accessible open ends 14 which are located at the exterior edges of the assembled wide universal cable rack of FIG. 9. The tab 27 on cross-over member 24 is seen inserted into the interior of cross-straps 12 on a first unitary rack assembly 11. The opposite ends of cross-over member 24, having brackets 29 attached thereto, are seen to surround the top portion of one of the side stringers 13 on a second unitary rack assembly 11. An over-head lighting fixture may pass beneath the cross-over members 24 while a universal cable rack is provided utilizing the space above the over-head light fixture. In this fasion, a universal cable rack having a desired depth determined by the length of upright leg 18 on horn member 17 is provided. The universal cable rack width is dependent upon the number of unitary rack assemblies 11 assembled running in a parallel direction and spaced apart by cross-over members 24. The universal cable rack length is determined by the number of unitary rack assemblies which are joined end to end by connection bars 31.

Note that the cross-straps 12 are staggered in this embodiment which eliminates the necessity for precise lengthwise alignment of unitary rack assemblies 11. Another embodiment of the universal cable rack is shown in FIG. 10 utilizing first, second and third unitary rack assemblies 11 for forming a wide cable rack. A bracket 32 is formed on either side to surround side stringer 13. In this fashion, adjacent unitary rack assemblies 11 running in parallel may be joined in side by side relationship. With the first and third unitary rack assemblies 11 maintained in one plane and the second, or center unitary rack assembly 11 elevated slightly and joined to the other two rack assemblies by bracket 32, a wide universal cable rack is formed. Horn members 17 having the configuration of either FIGS. 3 or 5 are shown inserted into the cross-straps 12 through open ends 14 thereof at the sides of the universal cable rack assembly of FIG. 10.

Yet another embodiment of the wide cable rack is shown in FIG. 11. First and second unitary rack assemblies 11 are shown running in a parallel direction spaced apart by cross-over members 24. Cross-over members 24 are of the embodiment shown in FIG. 7. In this fashion, the wide cable rack of FIG. 11 displays cross-straps 12 in alignment across the width of the universal cable rack. As in the embodiments described heretofore, the depth of the universal cable rack is determined by the length of the up-right leg 18 on horn member 17. Horn members 17 are inserted into the open ends 14 of the cross-straps 12 at the outside edges of the wide cable rack of FIG. 11. Also, as described heretofore, additional length of the universal cable rack of FIG. 11 may be obtained through the use of connection bars 31 for connecting additional lengths of unitary rack assembly 11 in end-abutting position to those shown.

A universal cable rack has been disclosed which provides adjustment of length, width and height of the rack for accommodating any desired number of cable runs. A cable rack is provided which provides maximum efficiency of use of available overhead space for cable runs.

I claim:

1. A unitary cable rack for use in supporting cable runs, comprising first and second tubular side stringers extending in parallel relation, one edge on each of said tubular side stringers lying in a common plane, a plurality of tubular cross straps having one side near the ends thereof affixed to said one edge of each of said tubular side stringers, said tubular cross-straps having accessible open ends and being spaced along said tubular side stringers and extending therebetween, a plurality of horn members, a generally vertical leg on each of said horn members, a generally horizontal leg on each of said horn members for insertion in said accessible open ends of said cross-straps, and an end portion on said generally horizontal leg, said end portion being bent out of alignment with the remainder of said generally horizontal leg for retaining said horn members in said cross straps, whereby the unitary cable rack has a cable run depth determined by the length of said generally vertical leg.

2. A unitary cable rack for use in supporting cable runs, comprising first and second tubular side stringers extending in parallel relation, one edge on each of said tubular side stringers lying in a common plane, a plurality of tubular cross straps having one side near the ends thereof affixed to said one edge of each of said tubular side stringers, said tubular cross straps having accessible open ends and being spaced along said tubular side stringers and extending therebetween, a plurality of horn members, a generally vertical leg on each of said horn members for insertion in said accessible open ends of said cross-straps, and a plurality of protrusions on said generally horizontal leg for contact with the interior of said cross-straps, whereby the unitary cable rack has a cable run depth determined by the length of said generally vertical leg.

3. A universal cable rack for supporting cable runs, comprising left and right side stringers, a plurality of cross straps attached to and extending between said left and right side stringers and having accessible open ends, a plurality of horn members each having a generally upright leg and a generally horizontal leg, said generally horizontal leg formed to fit in the accessible open ends of said cross straps, means formed on said generally horizontal leg for retaining said horn members in said cross straps, whereby a unitary cable rack is formed having a depth determined by the length of said generally upright legs for retaining cable runs therein, at least one additional unitary cable rack, a plurality of cross over members having a predetermined length and an inverted U-shape, each of said cross over members having opposing ends with said inverted U-shaped disposed therebetween, means on each of said opposing ends of said cross-over members for attaching to one side of said unitary cable rack and to one side of said additional unitary cable rack, whereby said unitary and additional unitary cable racks are in spaced parallel relationship, so that a plurality of said unitary and additional unitary cable racks may be run parallel to each other with said cross-over members extending therebetween for providing a light fixture space beneath said cross over members and a cable rack having a specified width.

4. A universal cable rack for supporting cable runs, comprising left and right side stringers, a plurality of cross straps attached to and extending between said left and right side stringers and having accessible open ends, a plurality of horn members each having a generally upright leg and a generally horizontal leg, said generally horizontal leg formed to fit in the accessible open ends of said cross straps, means formed on said generally horizontal leg for retaining said horn members in said cross straps, whereby a unitary cable rack is formed having a depth determined by the length of said generally upright legs for retaining cable runs therein, said left and right side stringers having a predetermined length, second and third unitary cable racks substantially similar in construction to said unitary cable rack, means for connecting said left and right side stringers on adjacent unitary cable racks at a plurality of positions therealong, so that when said second unitary cable rack is placed between said unitary and third unitary cable racks and adjacent side stringers are connected by said means for connecting, said horn members are inserted in the outside accessible open ends of said cross straps on said unitary and third unitary cable racks, a cable rack having a predetermined width is provided, said unitary and third unitary cable racks being substantially in the same plane, and said second unitary cable rack being in a plane slightly displaced therefrom so that side stringers on adjacent ones of said unitary cable racks overlie one another.

5. A universal cable rack for supporting cable runs, comprising a first unitary rack assembly including left and right side stringers, a plurality of cross-straps attached to and extending between said left and right side stringers and having accessible open ends, a plurality of horn members each having a generally upright leg and a generally horizontal leg, said generally horizontal leg formed to fit in the accessible open ends of said cross-straps, means formed on said generally horizontal leg for retaining said horn members in said cross-straps, at least one additional unitary rack assembly having construction similar to said first unitary rack assembly, a plurality of cross over members having an inverted U-shape, a tab on one end of said cross-over members formed to fit in the open ends of said cross-straps, a bracket on the other end of said cross-over members formed to engage said side stringers, so that when a plurality of first and additional unitary rack assemblies are placed in spaced parallel relation with said cross-over members extending therebetween, said cross-straps on said parallel first and additional unitary rack assemblies may be in staggered position, thereby providing a cable rack or predetermined width.

6. A universal cable rack for supporting cable runs, comprising a first unitary rack assembly including left and right side stringers, a plurality of cross-straps attached to and extending between said left and right side stringers and having accessible open ends, a plurality of horn members each having a generally upright leg and a generally horizontal leg, said generally horizontal leg formed to fit in the accessible open ends of said cross-straps, means formed on said generally horizontal leg for retaining said horn members in said cross-straps, at least one additional unitary rack assembly having construction similar to said first unitary rack assembly, a plurality of cross-over members having an inverted U-shape, a tab on each end of said cross-over members formed to fit in the open ends of said cross-straps, so that when a plurality of first and additional unitary rack assemblies are placed in spaced parallel relation with said cross-over members extending therebetween, said cross-straps on said parallel first and additional unitary rack assemblies are aligned, thereby providing a cable rack of predetermined width.

7. A universal cable rack for supporting cable runs, comprising left and right side stringers, a plurality of cross straps attached to and extending between said left and right side stringers and having accessible open ends, a plurality of horn members each having a generally upright leg and a generally horizontal leg, said generally horizontal leg formed to fit in the accessible open ends of said cross-straps, means formed on said generally horizontal leg for retaining said horn members in fixed position in said cross-straps, said plurality of cross-straps having an inverted U-shape, each of said cross-straps having opposing ends with said inverted U-shape disposed therebetween, so that a light fixture space is provided beneath said inverted U-shaped portions of said plurality of cross straps, whereby support for cable runs is provided on each side of said inverted U-shaped portions having a depth determined by the length of said generally upright legs.

* * * * *